May 9, 1944. L. S. HAMER 2,348,293
TAPERED BUSHING AND METHOD OF REMOVING THE SAME
Filed Oct. 7, 1940
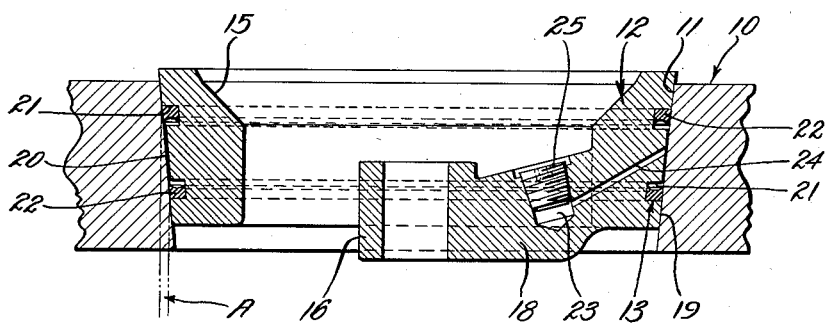
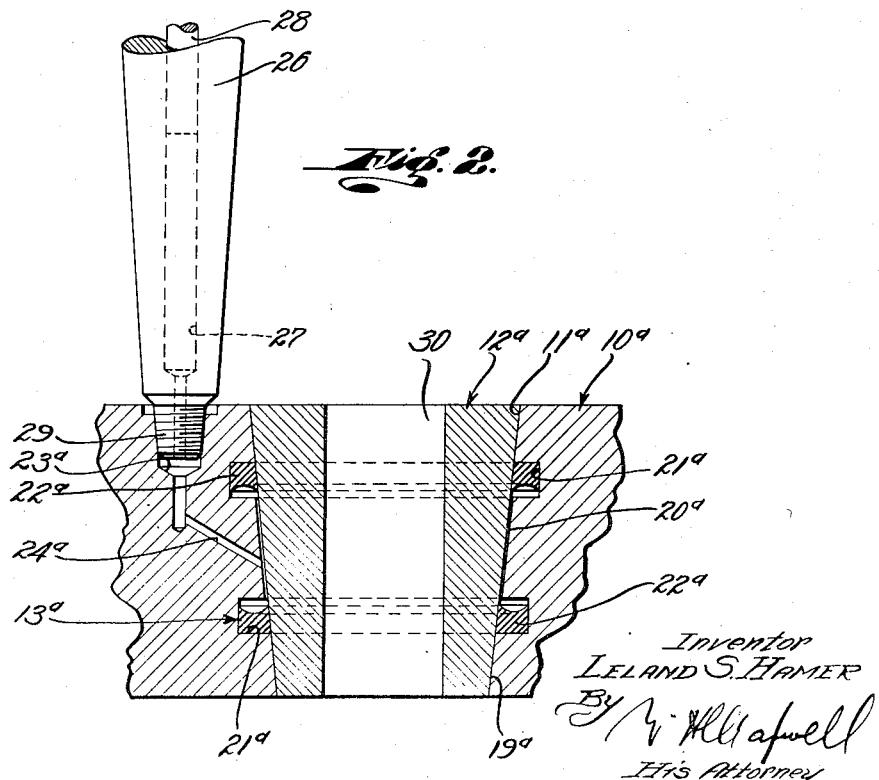
Inventor
LELAND S. HAMER
By
His Attorney Patented May 9, 1944

2,348,293

UNITED STATES PATENT OFFICE 2,348,293

TAPERED BUSHING AND METHOD OF REMOVING THE SAME

Leland S. Hamer, Long Beach, Calif., assignor of one-third to Paul A. Dewhirst, Los Angeles, and one-sixth to Vernon Zillgitt, Long Beach, Calif.

Application October 7, 1940, Serial No. 360,140

8 Claims. (Cl. 308—237)

This invention relates to bushings and it is a general object of the invention to provide practical effective tapered bushings and a dependable and rapid method for removing such bushings.

Bushings are widely used in mechanisms of various kinds and it is a common practice to fit tapered bushings in tapered openings in the machine parts to assure a more intimate engagement between the surfaces and to secure the bushings against movement in one direction. Great difficulty is often encountered in removing such tapered bushings when it becomes necessary to replace them. The bushings are often so tightly driven or forced into the tapered openings through the operation of the machine that they can only be removed by breaking them out, driving them out with sledge hammers or jack screws or by burning them out with welding torches, or the like. Such operations are time consuming and expensive and often result in irreparable damage to the adjacent machine parts.

Another object of this invention is to provide a bushing for arrangement in the tapered opening of a machine part or the like, which bushing may be easily and quickly removed from the opening without resorting to the use of hammers, jacks, wedges, torches or other devices liable to injure the bushing and the adjacent parts.

Another object of this invention is to provide a tapered bushing embodying novel means for utilizing fluid pressure to free the bushing from its opening in the machine part. The fluid pressure bushing-freeing means of the present invention is operable to easily and quickly free the tapered bushing from the tapered opening in situations where the bushing is so tightly frozen that it could be removed only with great difficulty by other means.

Another object of this invention is to provide a combination of a tapered bushing and a machine part provided with a tapered opening for the reception of the bushing, said combination embodying novel and effective means for confining fluid under pressure between the surfaces of the bushing and part for expanding the part away from the bushing and for simultaneously utilizing to the fullest degree the differential in fluid pressure action, existing by reason of the tapered surfaces, to urge or force the bushing out of the tapered opening.

Another object of this invention is to provide a combination of the character referred to embodying effective sealing means for preventing leakage around the bushing and for confining the fluid pressure which is introduced between the opposing tapered surfaces of the bushing and machine part.

A further object of this invention is to provide a method for removing a tapered bushing from a tapered opening which assures the quick easy removal of the bushing without endangering or damaging either the bushing or the surrounding machine part.

The various objects and features of my invention will be fully understood from the following detailed description of typical preferred forms and applications of the invention, throughout which description reference is made to the accompanying drawing, in which:

Fig. 1 is a vertical detailed sectional view of one form of the invention and Fig. 2 is a similar view of another form of the invention illustrating the manner in which fluid pressure is supplied to the bushing freeing means.

The method of the present invention may be employed for the removal of tapered bushings, linings, etc., of different types of mechanisms and the structural combination of the invention may be designed for use in practically any situation where a tapered bushing is required. In the following detailed description I will describe the typical forms and applications of the invention illustrated in the drawing, it being understood that the invention is not to be construed as limited or restricted to the specific forms herein disclosed but is to be taken as including any features or modifications that may fall within the scope of the claims.

The embodiment of the invention illustrated in Fig. 1 may be said to comprise generally a wall or support 10 having a tapered opening 11, a tapered bushing 12 arranged in the opening 11 and means 13 for freeing or removing the bushing 12 from the opening 11.

The support 10 may be any device or machine part provided to carry the bushing 12. In the drawing I have shown only a portion of the machine part or support 10 which has flat upper and lower sides. The opening 11 extends through the support 10 and is shaped and proportioned to receive the tapered bushing 12. In the preferred construction the opening 11 is round in transverse cross section and is tapered longitudinally throughout its length or throughout the major portion of its length. In the arrangement illustrated the wall of the opening 11 is tapered downwardly and inwardly. The wall of the opening 11 is preferably accurately formed and finished to tightly receive the bushing 12.

The bushing 12 is a tubular or annular member designed to fit or occupy the opening 11 to retain its operative position in the machine or mechanism. The bushing 12 shown in the drawing has a tapered upper surface 15 engageable by another part of the machine or mechanism (not shown) and has a central guide 16 for slidably receiving a machine part. The guide 17 may be joined with the body of the bushing 12 by a bridge or web 18. The periphery or exterior 19 of the bushing 12 is tapered downwardly and inwardly and is formed and finished to have even extensive engagement with the wall of the opening 11. The external surface 19 of the bushing 12 may bear in the opening 11 throughout a considerable portion of its length. The bushing 12 is designed to closely fit the opening 11 when initially installed and to remain lodged in the opening during operation of the machine.

The means for freeing or removing the bushing 12 from the opening 11 is an important feature of the invention. The means 13 includes or provides a confined space 20 between the opposing surfaces of the support 10 and bushing 12. The confined space 20 occurs between the exterior of the bushing 12 and the wall of the opening 11. In accordance with the invention the space 20 is of substantial axial extent having a length longitudinally of the bushing 12 equal to a large fraction, say one-half or more, of the zone of longitudinal engagement between the bushing 12 and the wall of the opening 11. In Fig. 1 the space 20 is entirely within the confines of the bushing 12, that is, the bushing is shaped to form or leave the space 20. It is to be understood that the space 20 may be formed in the support 10 in the manner illustrated in Fig. 2 or in both the support 10 and the bushing 12. The space 20 is preferably continuous or annular to extend completely around the bushing 12. The cavity or space 20 is of special or characteristic shape. The major intermediate portion of the space 20 is quite thin or shallow while the opposite ends of the space are deepened radially by the provision of grooves 21. The grooves 21 may have flat parallel upper and lower walls and are of substantial depth radially of the bushing. As illustrated the two grooves 21 may be alike in design or shape. The space 20 is preferably, though not necessarily, located so that its ends, as defined by the walls of the grooves 21, are substantially equally spaced from the ends of that portion of the bushing 12 which bears in the opening 11.

The means 13 further includes sealing rings 22 for preventing the escape or loss of fluid pressure from the space 20. The sealing rings 22 are arranged in the grooves 21 and are formed to bear axially against the outer end walls of the grooves 21 and to bear radially inward and outward against the bottom walls of the grooves and the wall of the opening 11. The sealing rings 22 may be proportioned to closely fit between the bottoms of the grooves 21 and the wall of the opening 11 and their initial size may be such that they are compressed when assembled in the grooves. The inner sides or opposing sides of the packing rings 22 are spaced from the inner walls of the grooves 21 leaving spaces or chambers in the grooves for receiving the fluid pressure. The sealing rings 22 are formed of a flexible or compressible resilient sealing material. In practice the sealing rings 22 may be formed of rubber, rubber composition, synthetic rubber, or a combination of such material and fabric or the like. The inner opposing surfaces of the rings 22 are preferably grooved or concave so that the rings are most effectively actuated inwardly and outwardly by the fluid pressure acting on their inner sides.

The means 13 for freeing or removing the bushing 12 further includes conduit means or port means for conducting fluid pressure to the space 20. This port means may be in either the support 10 or the bushing 12. In the particular case illustrated the port means for supplying pressure to the space 20 is formed in the bushing 12. The port means includes an inlet opening or socket 23 and one or more ports 24 connecting the socket 23 with the space 20. Where the bushing 12 has an internal projection such as the web 18 it may be desirable to form the socket 23 in this part. Thus, in the form of the invention illustrated the socket 23 is provided in the upper side of the web 18 and the port 24 leads outwardly or radially from the socket to the space 20. The outer portion of the socket 30 has a thread to facilitate the connection of a pressure generating and delivering means with the bushing. When the bushing is in use in the machine or mechanism a plug 25 may be threaded in the outer part of the socket 23. The space 20, the grooves 21 at the ends of the space, the port 24 and the inner part of the socket 23 may be packed with grease, oil or other suitable fluid when the bushing is installed in the opening 11. The removable plug 24 serves to retain this fluid and to prevent fluid, dirt, solid matter particles, etc., from entering the socket 23. The plug 25 may be formed and arranged so that it does not interfere with the normal operation of the bushing or the part 14 cooperating therewith.

In carrying out the bushing-removing method of the invention the bushing 12 is first made accessible. The plug 25 is threaded from the socket 23 and removed. Any available or selected source of fluid under pressure is then connected with the bushing 12 to deliver fluid pressure to the socket 23 or to create pressure in the socket, the port 24 and the space 20. A fluid pressure generating and supplying device of the kind partially illustrated in Fig. 2 may be employed. The pressure generating device shown in Fig. 2 comprises a body 26 having a cylinder 27, a ram or piston 28 operable in the cylinder 27 and a threaded fitting or pin 29 on the end of the body 26 adapted to be engaged in the socket 23. Following the removal of the plug 25 as above described, the pin 29 may be easily threaded in the socket 23. When this has been done the plunger 28 is operated to build up or generate fluid pressure in the port 24 and space 20. The space and port system of the means 13 and the cylinder 27 are preferably occupied by a substantially incompressible fluid and it is preferred to actuate the piston or plunger 28 to generate a high fluid pressure. The fluid under pressure supplied to or generated in the space 20 acts outwardly against the wall of the opening 11 and inwardly against the bushing 12. The high fluid pressure acting radially outward against the wall of the opening 11 throughout the extensive space 20 and its grooves 21 compress the material of the support 10 surrounding the opening 11 to enlarge or stretch the opening. The high fluid pressure acting inwardly against the bushing 12 has a tendency to compress the material of the bushing.

The inward and outward action of the fluid under pressure in the space 20 thus frees or tends to free the bushing 12.

The fluid under pressure supplied to or generated in the space 20 and its grooves 21 acts to move or urge the tapered bushing 12 outwardly in the tapered opening 11. Because of the tapered configuration of the opening 11 and the bushing 12 there is a substantial difference in diameter at the upper and lower ends of the extensive space 20. The space or distance A between the broken lines in Fig. 1 represents this differential in diameter. This differential in diameters is substantially uniform throughout the circumference of the bushing 12. The fluid under pressure in the space 20 acts upwardly against the tapered bushing 12 to raise or move the same from the opening 11 by reason of the diameter differential just described. The fluid pressure in the space 20 acts upwardly and outwardly on the bushing 12 to an extent equal to the fluid pressure action on an annular space defined by the circles constituting the uppermost and lowermost walls of the space 20 and represented by the lines at A in Fig. 1. The fluid under high pressure thus simultaneously compresses the material of the support 10 to urge the support away from the bushing 12, compresses the bushing 12 to reduce its diameter and acts outwardly or axially on the bushing 12. In practice the fluid pressure supplied or generated in the space 20 frees the tapered bushing 12 and shifts the same outwardly in the opening 11 so that it may be easily removed manually, for example, on the end of the pressure generating or developing tool.

The sealing rings 22 perform important functions during the bushing freeing and removing operations just described. The rings 22 engaged against the walls of the grooves 21 and the wall of the opening 11 are effective in preventing the leakage or escape of fluid under pressure from the space. The fluid under pressure acting against the concave inner sides of the rings 22 actuates or expands the rings radially inward and outward as well as axially to provide better seals. The rings 22 are formed of a somewhat yielding and conformable material so that they readily conform to any irregularities, pits, scores, grooves, projections or the like, which may be present on the wall of the opening 11. Further, the conformable sealing rings 22 are operable to occupy or close the space or spaces that may be present between the wall of the opening 11 and the bushing 12 by reason of an out-of-round condition of either the opening or the bushing or both. Thus, the sealing rings 22 assure the effective bushing freeing and removing operations described above even under conditions where the parts are worn, pitted, warped, and the like. The rings 22 may also serve to prevent the leakage of fluid around or past the bushing 12 during the operation of the machine.

The embodiment of the invention illustrated in Fig. 2 of the drawing may be said to comprise generally a machine part or support 10$^a$ having a tapered opening 11$^a$, a bushing 12$^a$ arranged in the opening 11$^a$ and means 13$^a$ for freeing and removing the bushing 12$^a$ from the opening 11$^a$.

The portion of the support 10$^a$ illustrated in the drawing has plain flat surfaces and the opening 11$^a$ extends through it from one side to the other. The opening 11$^a$ may be tapered throughout its length and its wall is formed or finished to rather accurately receive the bushing 12$^a$. The bushing 12$^a$ may be a simple tubular member having a central longitudinal opening 30 for receiving a machine part or for any other purpose. The exterior or periphery 19$^a$ of the bushing 12$^a$ is tapered and finished to accurately fit or conform to the opening 11$^a$. It will be observed that the bushing 12$^a$ may be of conventional construction.

The means 13$^a$ is similar to the above described means 13, providing for the delivery of fluid under pressure between opposing surfaces of the support 10$^a$ and bushing 12$^a$ to free the bushing 12$^a$. In the arrangement illustrated in Fig. 2 the means 13$^a$ is carried by and formed in the support 10$^a$. The means 13$^a$ includes or provides a confined space 20$^a$ between the opposing surfaces of the bushing 12$^a$ and the support 10$^a$. The space 20$^a$ resembles the space 20 described above but is formed in the support 10$^a$. The space 20$^a$ is preferably annular to surround the bushing 12$^a$ and is preferably spaced about midway between the ends of the bushing. As illustrated, the space 20$^a$ is of substantial axial extent. The opposite end portions of the space 20$^a$ are deepened by the provision of annular grooves 21$^a$ which receive sealing rings 22$^a$. The sealing rings 22$^a$ may be similar to the rings 22 above described, being formed to closely fit in the outer parts of the grooves 21$^a$, to bear against the outer and bottom walls of the grooves and the periphery 19$^a$ of the bushing 12$^a$. The inner sides or opposing sides of the rings 22$^a$ are spaced from the inner walls of the grooves leaving cavities or chambers which communicate with the space 20$^a$. The inner sides of the rings 22$^a$ are preferably concave.

The means 13$^a$ further includes a port system for delivering or conducting fluid under pressure to the space 20$^a$. This port system may comprise a port 24$^a$ leading outwardly from the space 20$^a$ to a socket 23$^a$ which is open at a face of the support 10$^a$. The socket 23$^a$ may carry a thread for cooperating with the thread of the pin 29 or other pressure supplying means.

The method of the invention as employed in connection with the structure shown in Fig. 2 is the same as with the construction of Fig. 1. In the normal operation of the machine a plug similar to the plug 25 may close the socket 29 and the means 13$^a$ may contain grease, oil or other suitable liquid. When the bushing 12$^a$ is to be removed the plug is unthreaded from the socket 23$^a$ and the pin 29 is threaded into the socket. Fluid pressure is then delivered to or generated in the socket 23$^a$, the port 24$^a$ and the space 20$^a$ as by operation of the plunger 28. This fluid under pressure acts as described above to expand the material of the support 10$^a$ around the opening 11$^a$, to compress or reduce the bushing 12$^a$ and to definitely urge the bushing 12$^a$ axially or outwardly. When a sufficient fluid pressure has been built up the bushing 12$^a$ is freed and shifted outwardly. The sealing rings 22$^a$ operate to prevent the escape or leakage of the fluid pressure from the space 20$^a$ and conform to irregularities in the bushing 12$^a$ and close any leakage spaces that may be present because of out-of-round conditions so that the fluid pressure is not lost. With the construction of Fig. 2 the support 10$^a$ is adapted to receive new or replacement bushings as the bushings wear and the bushings are easily and quickly removed without endangering, wearing or injuring the support 10$^a$.

Having described only typical preferred forms and applications of my invention I do not wish to be limited or restricted to the specific details herein set forth, but wish to reserve to myself any variations or modifications that may appear to those skilled in the art or fall within the scope of the following claims:

Having described my invention, I claim:

1. In combination, a support having a tapered opening, a tapered bushing seated in the opening, there being a space between the wall of the opening and the periphery of the bushing, sealing means for preventing the escape of fluid pressure from the ends of the space, and means for conducting fluid pressure to said space to free the bushing from the opening.

2. In combination, two elements, one a support having a tapered opening, the other a tapered bushing received in the opening, one or both of said elements being shaped to leave a confined space between the elements, spaced packing members in the space for preventing the leakage of fluid pressure from the ends thereof, and walls in one of the elements defining port means for conveying fluid to the space to free the bushing from the opening.

3. In combination, two elements, one a support having a tapered opening, the other a tapered bushing received in the opening, one or both of said elements being shaped to leave an annular chamber between the elements, said chamber having a substantial length axially of the elements, sealing rings in the end portions of the chamber for preventing the escape of fluid pressure from the chamber, and walls in at least one of the elements defining a port for conducting fluid pressure to the chamber.

4. In combination, two elements, one a support having a tapered opening, the other a tapered bushing received in the opening, one or both of said elements being shaped to leave an annular chamber between the elements, opposing sealing cups recessed in the ends of the chamber for preventing the leakage of fluid from the chamber, and walls in one of the elements defining a port communicating with the chamber between the sealing cups for conducting fluid pressure to the chamber.

5. In combination, two elements, one a support having a tapered opening, the other a tapered bushing received in the opening, one or both of said elements being shaped to leave an annular chamber between the elements having grooves at its opposite ends, sealing rings set in the grooves to prevent the leakage of fluid from between the elements, and walls in one of the elements defining a port for conducting fluid pressure to the chamber to free the bushing and shift it outwardly in the opening.

6. In combination, a support having a tapered opening, a tapered bushing arranged in the opening having a portion between its ends reduced in diameter to leave a confined chamber between the wall of the opening and the bushing, sealing rings set in the opposite ends of the chamber for preventing the escape of fluid pressure from the chamber, and walls in the bushing defining a port communicating with the chamber between the rings for carrying fluid pressure to the chamber to shift the bushing outwardly in the tapered opening.

7. In combination, a tapered bushing, a support having a tapered opening for receiving the bushing, the opening being enlarged in diameter throughout a zone between the ends of the opening to leave an annular space surrounding the tapered bushing, sealing rings in the end portions of the space operable to prevent the leakage of pressure from the space, the sealing rings being spaced apart and having opposing concave sides, and walls in the support defining a port communicating with the space at a point between the sealing rings for conducting fluid pressure to the space to shift the bushing outwardly in the opening.

8. In combination, two elements, one a support having a tapered opening, the other a tapered bushing received in the opening, one or both of said elements being shaped to leave a confined space between the elements, the axial extent of the space being equal to at least one-half the axial length of the zone of engagement of the elements, and walls in one of the elements defining a port communicating with the space to deliver fluid pressure thereto to shift the bushing outwardly in the opening.

LELAND S. HAMER.